Jan. 26, 1960     R. J. WEHRMAN     2,922,305
SONIC FLOW PYROMETER
Filed Aug. 19, 1954

INVENTOR
Ralph J. Wehrman
BY L. D. Busch
ATTORNEY

United States Patent Office 2,922,305
Patented Jan. 26, 1960

2,922,305

SONIC FLOW PYROMETER

Ralph J. Wehrman, Anna, Ohio, assignor to General Motors Corporation, Detroit, Mich., a corporation of Delaware Application August 19, 1954, Serial No. 450,939

3 Claims. (Cl. 73—349)

This invention relates to temperature sensing elements generally and more particularly to a pyrometer type temperature sensing device for use in accurately measuring true gas temperatures.

Pyrometer type temperature sensing devices including thermocouples have been used in the past for measuring gas temperatures within enclosures such as furnaces, combustion chambers and the like. Thermocouples, however, are sensitive to several environmental factors other than the gas temperature which they are intended to measure. These extraneous factors include wall temperatures, gas velocities and the possible presence of luminous flames. The wall temperatures cause positive or negative radiation errors depending on whether the walls are hotter or cooler than the gas temperature. The velocity of the gas whose temperature is being measured will also cause a velocity error since the thermocouple recovers only part of the kinetic energy of the moving gas. Further the velocity of the gas is not always known. The presence of luminous flames will introduce positive radiation errors due to the high radiation level of such flames.

It has been proposed in the past to provide a temperature response element within an elongated shielding member whereby the element might be disposed apart from the walls of the gas enclosure and be shielded from radiation effects. It has further been proposed to dispose the temperature sensing element within a sonic or critical flow of gas to be measured to assure maximum attainable heat transfer. However, the measurement of true gas temperature still requires the computation of the error due to the impact of the gas against the temperature sensing element disposed in the path of the gas flow.

It is now proposed to provide a pyrometer which includes an elongated shielding member within which is disposed a temperature sensing element and to provide for the critical or sonic flow of the gas to be measured through such a shielding member. However, to obviate the necessity formerly experienced of computing impact error it is proposed to dispose the temperature sensing element out of the direct flow of the gas to be measured. It is proposed to provide a critical flow nozzle to which are secured thermal conductive wires and which nozzle itself is adapted to act as a thermocouple junction with respect to such wires. It is proposed to provide for the flow of hot gases through such nozzle and to thereby enable measurement of the temperature of such gas at the critical flow rate without obstructing such flow. The proposed thermocouple flow nozzle may be a unitary member preferably of a material different from the material of either thermal conductive lead connected thereto, or may be made of two different concentric parts of the same material and conductivity as the leads connected to such parts.

Figure 1:
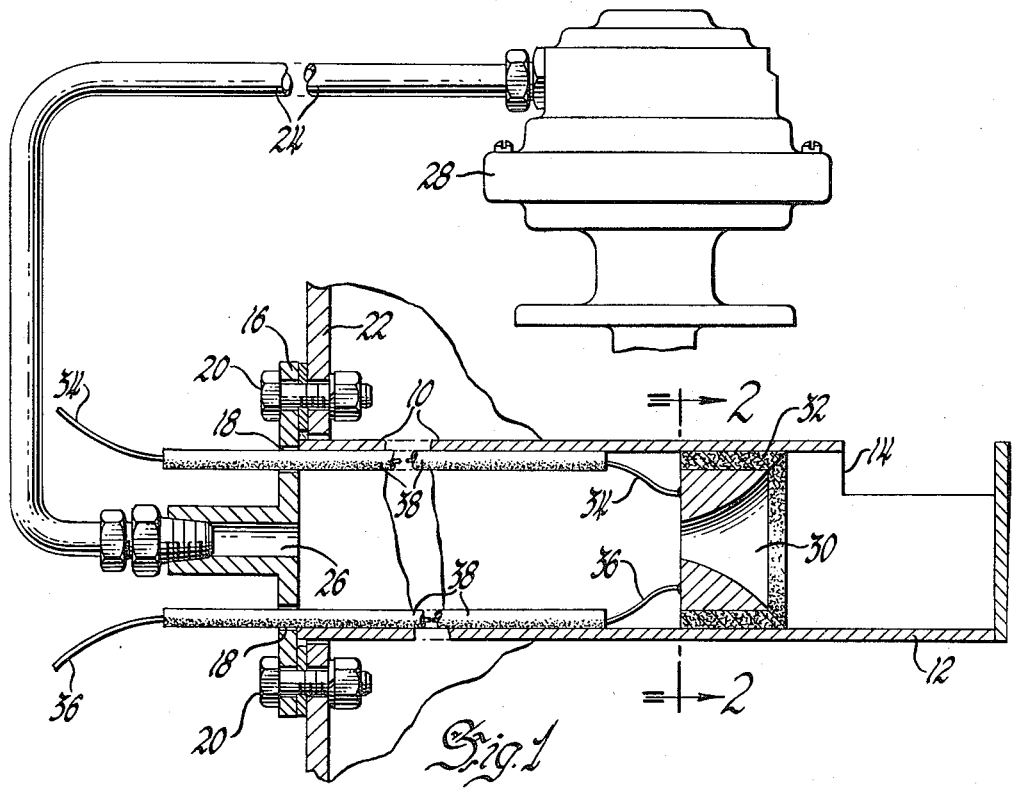
Figure 1 is a side elevational view of the proposed sonic suction pyrometer.

The proposed sonic suction pyrometer includes an elongated tubular shielding member 10 adapted to be extended within the vicinity of a gaseous fluid whose temperature is to be measured. The outer end of the shielding member is closed off as at 12 and an opening 14 is provided through one side of the shielding member adjacent the end thereof. A collar 16 is provided about the other end of the shielding member 10 and has a plurality of apertures 18 formed therethrough by means of which the shielding member may be secured by fastening means 20 to the wall 22 of the furnace or other enclosure through which the pyrometer is extended. A flexible conduit 24 is connected between the outlet end 26 of the shielding member 10 and a vacuum pump 28. Operation of the pump 28 is adapted to draw hot gases from their normal environment into the shielding member 10 where the adverse effects of wall and luminous flame radiation are eliminated.

A critical flow nozzle 30 is disposed within the end of the shielding member 10 behind the opening 14. The nozzle 30 is mounted upon a heat insulator gasket 32 to isolate the nozzle from the heat of the walls of the shielding member 10. Wires 34 and 36 are connected to the back of the nozzle 30 on diametrically opposite sides thereof. These wires have an insulation covering 38 and are disposed within the shielding member 10 close to the sides thereof. The bare portion of wires 34 and 36 are only such as is necessary to extend from the insulation covering 38 to the connection with the back of the nozzle 30. The bare wires are thus disposed out of the gas flow through the nozzle. The ends of the wires 34 and 36 extend through the end of the shielding member 10 and are adapted to be connected to a millivoltmeter or other instrument.

Figure 2:
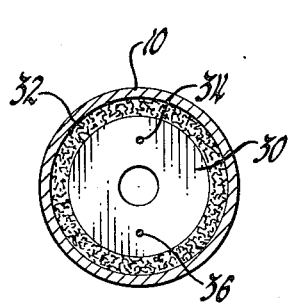
Figure 2 is a cross sectional view of the pyrometer taken in the plane of line 2—2 of Figure 1 looking in the direction of the arrows thereon.
Figure 3:
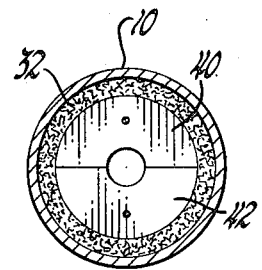
Figure 3 is a modification of the thermocouple flow nozzle of the proposed pyrometer.

As shown in Figures 1 and 2, the critical or sonic velocity flow nozzle 30 is a one-piece member. Connected thereto are the wires 34 and 36. It is necessary that the wires 34 and 36 be of dissimilar metals having different thermoelectric properties, and the nozzle 30 may be of a third material. Thus, two thermocouple junctions are formed, one at each of the connecting points of the wires and the nozzle. A selection of the dissimilar metals would be made such that the measurement obtained from the device will be the cumulative effect of the two junctions. For best results the wires should be connected to the one-piece nozzle on diametrically opposite sides thereof and at equal radial distances from the center of the nozzle. In Figure 3 there is shown a two-piece critical flow nozzle formed of two complementary parts 40 and 42. A nozzle of this type is preferably made of material the same as the thermocouple wire to which it is to be connected. Thus the thermocouple junction in the nozzle of Figure 3 is where the two parts 40 and 42 of the flow nozzle are secured together.

In utilizing the proposed pyrometer for measuring the true temperature of hot gases the shielding member 10 is extended through the wall 22 of the gas enclosure to dispose the temperature sensing element, which is here the flow nozzle 30, apart from the walls of the gas enclosure and consequently away from wall and luminous flame radiation effects. The vacuum pump 28 draws hot gases into the inlet opening 14 and through the critical flow nozzle 30. The flow of hot gases through the nozzle is accelerated to sonic velocity to eliminate the normal velocity error by providing a stable non-fluctuating gas flow rate. The proportional recovery of thermal energy may readily be calculated for a sonic velocity flow and provides a known constant for further temperature calculations or instrument calibration. The adaptation of the critical flow nozzle as a temperature sensing element eliminates impact errors which must be accounted for in devices of this nature having a thermocouple device disposed directly within the gas flow thereby enabling a much more reliable and ready calculation of true gas temperature.

I claim:

1. A thermal sensing device including a thermo-electric member formed to provide part of a sonic velocity fluid flow nozzle and having a dissimilar thermo-electric member secured thereto to provide the complementary part of said nozzle and lead members secured to said first thermo-electric members and extending outside the flow of fluid through said nozzle to provide in combination therewith a thermocouple responsive to the temperature of fluid flowing through said nozzle at a constant and known velocity.

2. A pyrometer for measuring the temperature of a fluid and which includes complementary semicircular members secured together to provide a sonic velocity fluid flow nozzle, said members being formed from dissimilar thermo-electric members lead members secured to said thermo-electric members to provide a thermocouple, said lead members positioned outside the flow of fluid through said nozzle, and means for inducing said fluid to flow through said nozzle at sonic velocity to provide a known and constant velocity fluid flow for the measurement of said fluid temperature by such thermocouple-nozzle.

3. A temperature sensing device including an elongated tubular member adapted to have one end thereof extended within a fluid having a temperature which is to be measured, inlet and outlet openings formed in opposite ends of said tubular member, a first thermo-electric member disposed within said tubular member and having a fluid flow orifice provided therethrough, second and third thermo-electric members having thermo-electric properties dissimilar to each other and to said first thermo-electric member secured to said thermo-electric member on opposite sides of said orifice to provide in combination with said first member a pair of thermocouple junctions responsive to the temperature of the fluid flowing through said orifice, said dissimilar thermo-electric members extending along the wall of said tubular member and outside the flow of fluid through said tubular member, and means for inducing said fluid to flow through said orifice at sonic flow rates to provide for the temperature measurement of said fluid at a constant and known fluid flow velocity.

References Cited in the file of this patent

UNITED STATES PATENTS

| 1,746,012 | Schack | Feb. 4, 1930 |
| 1,946,319 | Hodgson | Feb. 6, 1934 |

FOREIGN PATENTS

| 238,396 | Germany | July 7, 1909 |
| 484,464 | Canada | July 1, 1952 |

OTHER REFERENCES

Article: "A Sonic Flow Pyrometer for Measuring Gas Temperature," by Lalos, in Journal of Research of National Bur. Stds., vol. 47, No. 3, September 1951 (Reseach Paper 2242).

Article: "Measurement of High Temperatures in High Velocity Gas Streams," by King, in Transactions of the ASME, July 1943.